United States Patent [19]

Hashihara

[11] Patent Number: 4,722,567

[45] Date of Patent: Feb. 2, 1988

[54] FISHING CHAIR

[75] Inventor: Muneshige Hashihara, Tokyo, Japan

[73] Assignee: Takara Kohgei Inc., Tokyo, Japan

[21] Appl. No.: 935,305

[22] Filed: Nov. 26, 1986

[30] Foreign Application Priority Data

May 1, 1986 [JP] Japan .................................. 61-99437
May 14, 1986 [JP] Japan ................................ 61-108702

[51] Int. Cl.⁴ ............................................. A47C 7/62
[52] U.S. Cl. ..................................... 297/217; 297/56;
297/188; 297/337; 297/349
[58] Field of Search .................... 297/56, 57, 349, 311,
297/217, 188, 337

[56] References Cited

U.S. PATENT DOCUMENTS

| | | | |
|---|---|---|---|
| 3,754,786 | 8/1973 | Boucher et al. | 297/56 X |
| 3,821,825 | 7/1974 | Bailey | 297/349 |
| 4,278,287 | 7/1981 | Esposito | 297/217 X |
| 4,460,216 | 7/1984 | Keller | 297/349 |

FOREIGN PATENT DOCUMENTS

| | | | |
|---|---|---|---|
| 368152 | 9/1906 | France | 297/349 |
| 2221251 | 3/1977 | France | 297/56 |

Primary Examiner—James T. McCall
Attorney, Agent, or Firm—Wenderoth, Lind & Ponack

[57] ABSTRACT

A fishing chair has a seat member and a rotary seat plate which is rotatably mounted on the seat member and is provided with a grip holder. When an angler sits on the rotary seat plate and inserts the grip end of a fishing rod in the grip holder, the rotary seat plate is smoothly rotated on the seat member in conjunction with the fishing rod. Particularly on a fishing boat, this chair supports the fishing rod and, when a fish is hooked, enables the angler seated stably on the rotary seat plate to change direction following the movement of the hooked fish.

9 Claims, 10 Drawing Figures

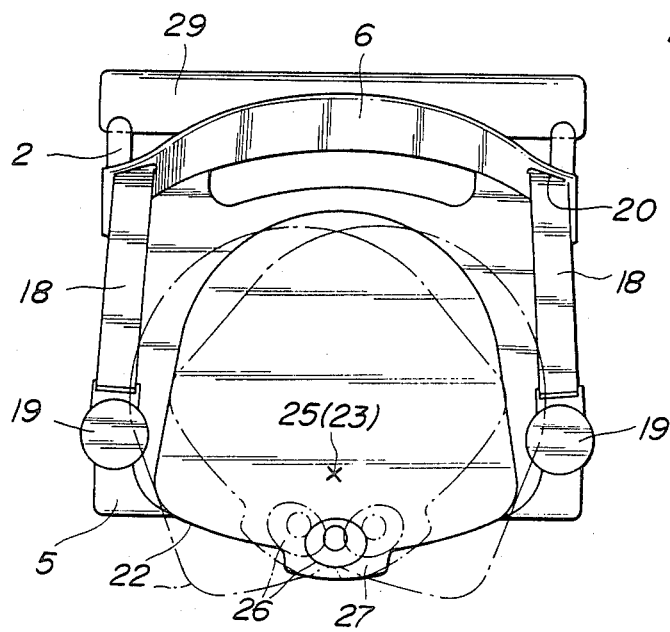
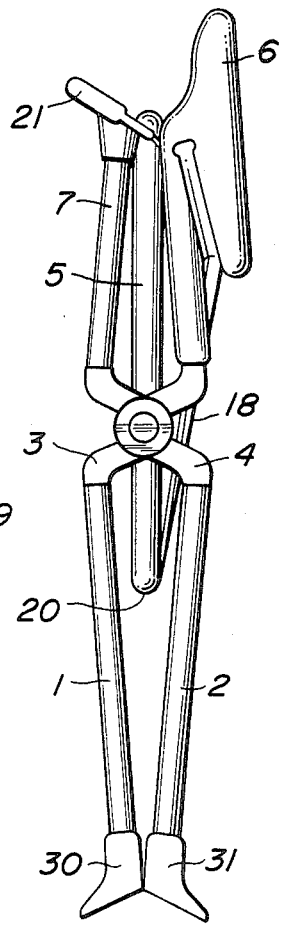

FISHING CHAIR

BACKGROUND OF THE INVENTION

This invention relates to a fishing chair suitable for fishing on a boat deck.

Generally, as fishing chairs or fighting chairs, folding chairs of good portability are utilized popularly. In boat fishing, particularly, in boat fishing aimed at catching medium to large fish, it may be advantageous to use the chair of the rotatable type capable of supporting a fishing rod and, at the same time, allowing the direction of the supported fishing rod to be turned so as to follow the movement of a hooked fish.

Among the conventional chairs of this class for use on fishing boats, there are known rotary fishing chairs constructed so that the legs thereof are secured on the boat deck, the entire chair proper is supported rotatably about the fixed legs, and the seat thereof is provided on the front edge thereof with a rest for the fishing rod.

The rotary fishing chairs capable of changing their directions are generally designed to be mounted exclusively on trolling boats. They, however, pose a problem in that they are not usable in their unmodified from for general multi-purpose boats because they have various restrictions such as, for example, the requirement that they should be stationary, i.e. not portable, the requirement that they should be specially designed for the convenience of installation, and the requirement that the boat themselves should offer places suitable for the installation.

There is also known in the art, a folding chair which comprises front legs integrally continuing into a backrest, hind legs pivotally attached at the top thereof or at a point halfway along the entire height thereof to the front legs at a height halfway along the entire height thereof by means of a pivotal shaft, and a seat member rotatably supported by a supporting shaft. The folding chair of this construction is readied for use, i.e. for sitting, by opening the front and hind legs relative to each other thereby automatically causing the aforementioned supported seat member to assume a level position convenient for sitting and, after use, readied for storage or transportation by closing the front and hind legs toward each other from their open state with the pivotal shaft as a fulcrum and consequently causing the seat member to be rotated and brought into contact with the closed legs thereby causing the entire chair to fold into a flat compact state.

This folding chair is convenient for storage and is also convenient for transportation because it can be folded into a flat compact state after use. As a simple easy seating gear, this folding chair is finding extensive utility. For various purposes such as facilitating the handling and lowering the cost of product, the folding chairs of this construction are generally light weight and are fabricated by using metallic pipes as the raw material.

As a result, this folding chair has the disadvantage in that it is deficient in stability and toughness required for the sake of safe use in spite of the convenience of handling and the ease of fabrication.

BRIEF SUMMARY OF THE INVENTION

A primary object of this invention is to provide a fishing chair adapted to be portable, readily movable from one place of installation to another, easily mountable on any ordinary boat, and readily removable after use, thereby eliminating the drawbacks of the conventional fixed fishing chair and, at the same time, being simple in construction and suitable for an angler desiring to catch large fish.

Another object of this invention is to provide a fishing chair which, in order to improve the conventional folding chair suffering from a deficiency in stability and toughness, has the basal ends of four legs thereof adapted to be securely lodged on a given floor surface whether or not the floor may happens to have rugged or curved surfaces, a stable seat member for the angler, and front legs and hind legs thereof adapted to be mutually interconnected for complementary reinforcement.

In order to achieve the objects described above, the fishing chair of the present invention comprises a seat member, a rotary seat plate mounted on the seat member, and a grip holder disposed on the front edge portion of the rotary seat plate and adapted to support the grip end of a fishing rod, wherein the fulcrum for the rotation of the aforementioned seat member is formed in a substantially middle portion of the seat member between the central part of the aforementioned rotary seat plate and the front edge portion thereof, and the rotary seat plate is pivotally supported on the aforementioned fulcrum of rotation.

The fishing chair of this invention is constructed so that when it is readied for use, the angler is seated on the rotary seat plate pivotally mounted on the upper side of the seat member and is allowed to have the grip end of his fishing rod supported in the grip holder disposed on the front end of the rotary seat plate and the fishing line kept naturally dangling from the tip of the fishing rod. By causing the fishing rod to be supported by the grip holder on the front edge portion of the rotary seat plate, the center of gravity of the rotary seat plate is shifted to a halfway point between the center of the seat plate and the front edge portion thereof and the fulcrum of rotation disposed on the underside of the rotary seat plate directly below the aforementioned halfway point maintains a substantial balance between the body weight of the angler and the weight of the fishing rod. As a result, the rotary seat plate is allowed to rotate smoothly and the fishing rod supported in the grip holder is allowed to change its direction freely to follow the movement of a hooked fish.

The fishing chair is has enhanced strength by having the front legs and the hind legs rotatably attached to respective pivotal axes and are consequently folded pivotally, respective resilient connecting boards cross between the basal ends of the laterally opposed front legs and the between the basal ends of the similarly opposed hind legs, and the connecting boards inclusive of the basal ends of the legs are each coated with a resilient material made of rubber or flexible synthetic resin thereby constituting leg end reinforcing members serving to interconnect the basal ends of the legs. Due to the resiliency of the reinforcing boards, the mutually connected basal ends of the legs are furnished with positional allowance enough for the individual basal ends of the legs to settle stably on a given floor having a more or less rugged or curved surface. Furthermore, because the reinforcing members coated with rubber or flexible synthetic resin contact the floor surface and the individual basal ends of the legs are steadily settled, the fishing chair enjoys suppressed slippage in addition to stability and enables the angler to be seated with improved stability.

BRIEF DESCRIPTION OF THE DRAWINGS

Other objects and characteristics of this invention will become apparent from the further disclosure to be made in the following detailed description of a preferred embodiment with reference to the accompanying drawings, wherein:

FIG. 6 is a plan view of the chair.

FIG. 7 is a side view of the chair in a flatly folded state.

DETAILED DESCRIPTION OF PREFERRED EMBODIMENTS

A fishing chair according to one embodiment of the present invention will be described hereinafter with reference to FIG. 1 through FIG. 6. In this embodiment, the chair is constructed so that the main body part thereof will be foldable.

Figure 1:
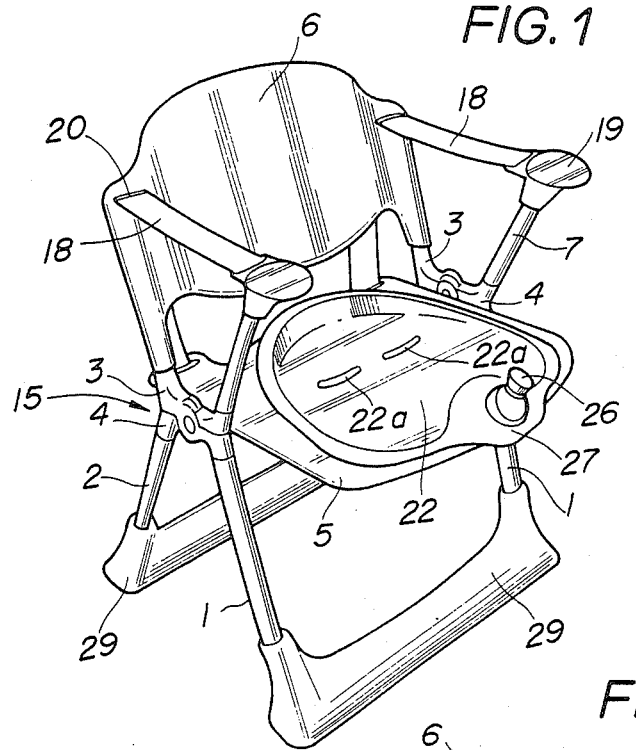
FIG. 1 is a perspective view of one embodiment of the fishing chair of the present invention.
Figure 2:
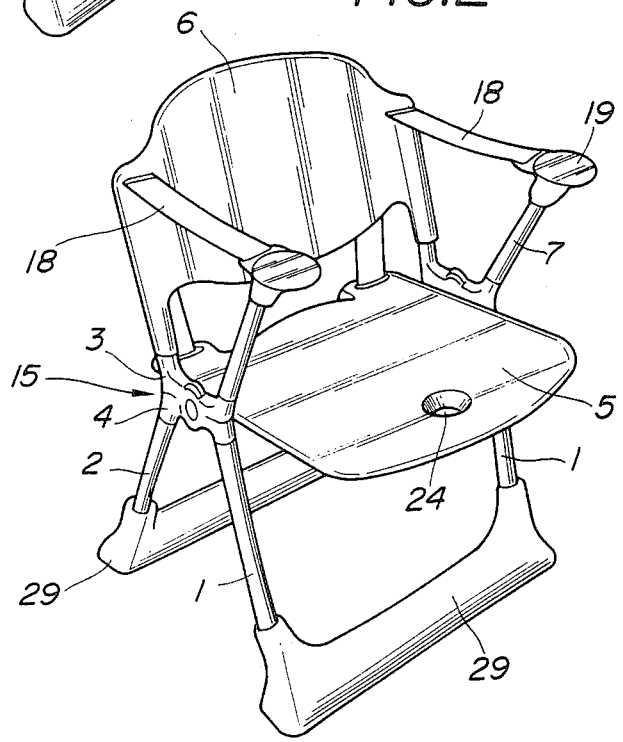
FIG. 2 is a perspective view of the chair proper in a state after removal of a rotary seat plate.
Figure 3:
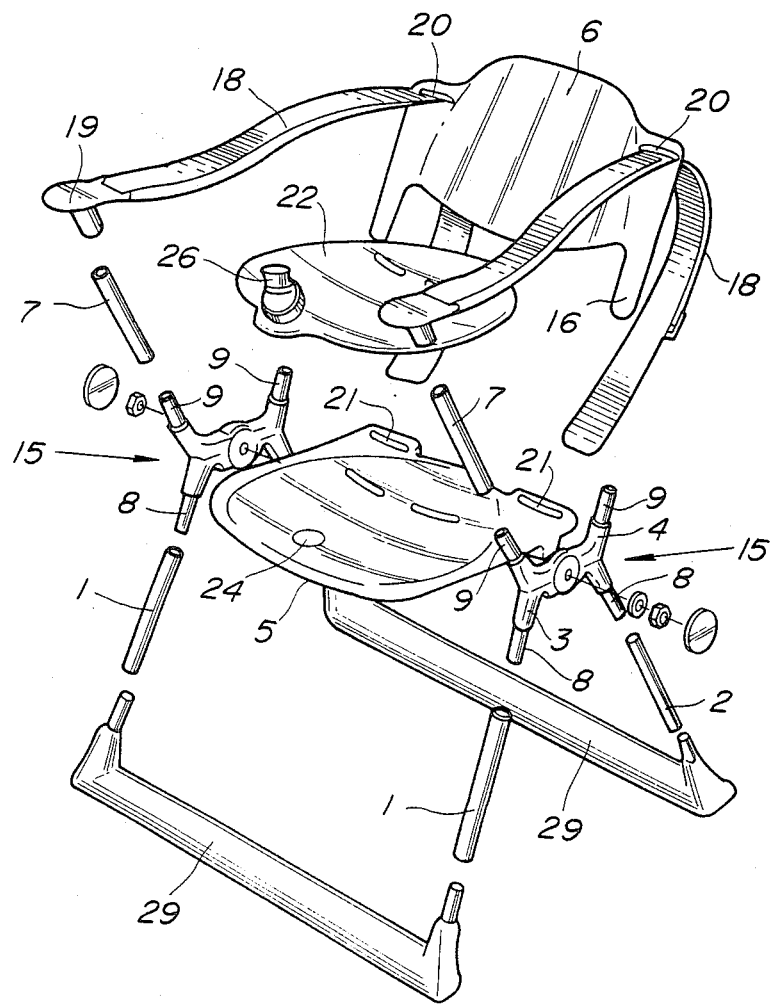
FIG. 3 is a perspective view of the chair in an exploded state.
Figure 4:
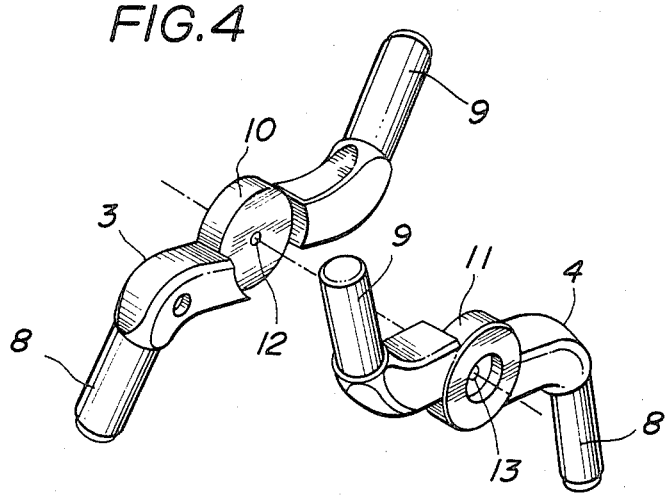
FIG. 4 is a magnified perspective view of connecting members in a separated state.
Figure 5:
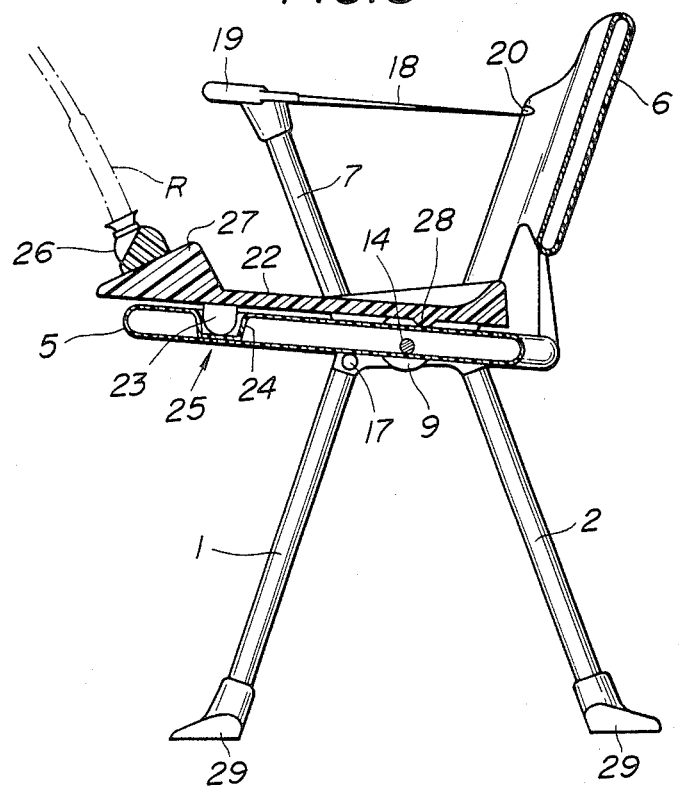
FIG. 5 is a longitudinally sectioned side view taken along the center line of the chair.

In the diagram, 1 stands for a front leg, 2 for a hind leg, 3 and 4 each for a connecting member, 5 for a seat member, 6 for a backrest, and 7 for an armrest support. The connecting members 3 and 4 in this embodiment are each formed substantially in the shape of the letter S as illustrated in FIG. 4. The connecting members are each provided at one end thereof with an integrally formed insertion shaft 8 having the shape of a boss. By the insertion of these insertion shafts 8 into upper end portions of the front and hind legs 1 and 2 made of a pipe material, the legs are engaged with the respective connecting members. The connecting members 3 and 4 are each provided at the other end thereof with an insertion shaft 9. By the insertion of these insertion shafts 9 into the end portions of the armrest supports 7, the armrest supports are engaged with the respective connecting members. Thus, the front legs 1 are connected to the backrest 6 by means of the connecting members 3, and the hind legs 2 are connected to the respective armrest supports 7 by means of the connecting members 4. The connecting members 3 and 4 are integrally formed respectively with disc-like pivotal parts 10 and 11 in the central part of the connecting members. The connecting members are rotatably joined to each other by disposing the pivotal parts sideways face each other and inserting a pivotal shaft 14 through perforated shaft holes 12 and 13 at the centers thereof. As a result, left and right leg frame members 15 are completed.

The leg frame members 15 are laterally opposed to each other and interconnected by the aforementioned pivotal shaft 14. The front and hind legs 1 and 2 fastened to the connecting members 3 and 4 are interconnected to each other rotatably about the pivotal shaft 14 as the axis so as to be opened and closed freely.

Tubular fitting parts 16 protruding downwardly from the lateral portions of the backrest 6 are connected to the insertion shafts 9 protruding upwardly from the connecting members 3 on one side. To the upward insertion shafts 8 of the other connecting members 4, the armrest supports 7 are connected so as to protrude upwardly in an oblique direction.

When the two connecting members 3 and 4 pivotally interconnected with the pivotal shaft 14 have their opposed surfaces vertically brought into planar mutual contact, the front and hind legs 1 and 2 are held in an open posture. At the same time, the backrest 6 is held in a backwardly raised posture in an oblique direction, and the armrest supports 7 thrust upwardly in an oblique direction. When these two connecting members 3 and 4 are rotated about the pivotal shaft 14, the front and hind legs 1 and 2 are brought toward each other and, at the same time, the armrest supports 7 and the backrest 6 are brought into mutual contact so that the fishing chair is folded into a flattened shape as illustrated in FIG. 6.

The seat member 5, by being traversed with the pivotal shaft 14 which extends between the laterally opposed connecting members, is supported rotatably about this pivotal shaft 14. When the seat member 5 is turned to a level position, it is allowed to retain its horizontal posture by having the lower side thereof held in contact with a rodlike stopper 17 extending between the laterally opposed connecting members 3.

Armrest belts 18 support the rear part of the aforementioned seat member when the legs are opened and stretch between the armrest supports 7 and the backrest 6 to form armrest parts. These belts are fixed at one end thereof to the upper ends of the armrest supports 7 through the medium of fitting members 19. The armrest belts 18, halfway along their entire lengths, pass through perforations 20 formed near upper lateral edges of the backrest 6 and, are fastened to stop parts 21 formed in the rear lateral edges of the seat member 5. When the backrest 6 and the armrest supports 7 are open from each other to prepare the chair for use, the armrest belts 18 are horizontally stretched taut to form armrest parts on the opposite lateral sides of the seat member and, in the meantime, are caused to pull up the rear edge part of the seat member 5 rotatably supported about the pivotal shaft 14 and bring the seat member to a level position, thereby preventing the seat member from being rotated backwardly in a downward direction.

A rotary seat plate 22 is detachably mounted on the seat member 5 of the folding chair constructed as described above. The rotary seat plate 22 in the present embodiment is slightly smaller in size than the seat member 5 and is mounted so as to be positioned substantially in the central part of the seat member 5. As illustrated particularly in FIG. 5, on the underside of this seat plate 22, a protuberance 23 having a hemispheric leading end is disposed in front of the center of the seat plate, specifically at the substantially halfway position between the central part and the front edge of the seat plate. This protuberance 23 is fitted into a recess 24 formed in the seat member 5 at the position corresponding to that of the protuberance 23, so that the seat plate 22 mounted on the seat member 5 will not readily fall out and, at the same time, so that the seat plate 22 is rotatable in clockwise or counterclockwise directions with the point of engagement of the protuberance and the recess as a fulcrum 25 of rotation which allows a change in direction of the seat plate 22 relative to the seat member 5 as illustrated in FIG. 6. Through holes 22a bored in the rotary seat plate 22 are intended as passages for the water liable to collect on the seat plate 22 or for the air. They represent an optional feature of the fishing chair.

A grip holder 26 is attached to the front edge of the aforementioned rotary seat plate 22 and is adapted to receive the grip end of a fishing rod R.

This grip holder 26 is formed in the shape of a bottle, fixed on a base 27 formed at the front edge of the rotary seat plate 22, and is provided therein with an opening which is directed toward the front in an oblique direction.

The protuberance 23 of the rotary seat plate 22 has a height that is greater than the depth of the recess 24 so that when the protuberance is fitted into the recess and the leading end thereof reaches the bottom of the recess, the lower side of the seat plate 22 will slightly float above the upper side of the seat member 5. In addition to this measure, a sliding projection 28 is formed on the underside of the seat plate 22 near the rear part thereof and is kept in contact with the upper side of the seat plate, so that when the seat plate is rotated about the leading end of the protuberance 23, i.e. the fulcrum 25 of rotation, the seat plate will be smoothly rotated with the entire lower side of the seat plate prevented from direct contact with the upper side of the seat member 5.

The fishing chair of the present invention is constructed as described above. By opening the front and hind legs and consequently opening the backrest 6 and the armrest supports 7, the armrest belts 18 are stretched taut and, at the same time, the seat member 5 is brought to a level position fit for sitting. Then, the rotary seat plate 22 is mounted on the seat member 5 with the protuberance 23 of the seat plate fitted into the recess 24 of the seat member, readying the fishing chair for use.

Due to the cooperation of the protuberance 23 and the recess 24, the rotary seat plate 22 mounted on the seat 5 is prevented from falling off the seat member. Furthermore, due to the formation of the fulcrum 25 of rotation the rotary seat plate is allowed to rotate freely about this fulcrum as the center.

In the fishing chair of this invention constructed as described above, an angler using this chair is seated on the rotary seat plate while straddling the grip holder 26 and is allowed to plant the grip end of his fishing rod R in the grip holder 26 for firm retention. As a result, the angler is free to hold the fishing rod at a desired angle, with his hands gripping proper portions of the fishing rod.

When a fish is caught on the hook suspended from the fishing rod held in the state just mentioned, the angler seated as before is allowed to manipulate the fishing line. When the fish moves and the fishing rod changes its direction accordingly, the rotary seat plate 22 may be rotated about the fulcrum 25 of rotation and the angler is automatically allowed to change his direction in conjunction with the fishing rod following the movement of the fish.

The embodiment illustrated has been depicted as a folding chair which is capable of being folded by closing the legs from their open state. With respect to the main body part of this folding chair, the seat member is only required to have a level surface and to possess means for enabling a rotary seat plate to be rotatably supported thereon, i.e. means capable of forming a fulcrum of rotation for the rotary seat plate. So long as this requirement is fulfilled, this invention can be embodied in an ordinary chair which cannot be folded or in a chair which is destitute of armrests and/or a backrest.

In accordance with this invention, the angler seated in the chair is able, as described above, to plant the grip end of his fishing rod in the grip holder 26 formed in the front edge of the rotary seat plate and rely on the grip holder to bear the weight of the fishing rod and, what is more, the angler is allowed to manipulate the fishing rod with the grip holder 26 as the fulcrum and devote all his attention to the manipulation of the fishing rod while being seated very comfortably. Furthermore, he can handle the fishing rod stably without any immoderate exertion of effort and enjoy the pleasure of fishing because the free rotation of the rotary seat plate 22 permits the fishing rod and the angler to change direction following the movement of the hooked fish.

In the fishing chair of the present invention, the fulcrum 25 of rotation of the rotary seat plate 22 is formed toward the front from the central part of the seat plate, i.e. at a halfway position between the central part and the front edge of the seat plate. When this fishing seat is put to use and a fish is caught on the hook dangling from the fishing rod, the tug with which the hooked fish exerts on the fishing rod acts on the grip holder 26 at the front edge of the rotary seat plate. The force consequently produced is balance with the body weight of the angler across the aforementioned fulcrum 25 of rotation. Thus, the angler and the fishing rod are allowed to rotate smoothly about the fulcrum 25 of rotation.

Furthermore, the fishing chair of this invention is constructed so that the rotary seat plate and the seat member can be combined so securely as to preclude the possibility of accidental separation by simply fitting the protuberance 23 of the rotary seat plate into the recess 24 of the seat member. When the rotary seat plate is removed, the remaining main body part of the chair can be utilized in its unmodified form as a chair. Since this chair is not meant for stationary attachment to a place of use as on a boat deck, it can be moved freely and need not be limited to use on a fishing boat.

As concerns the shape of the main body part of the fishing chair, no special requirement is imposed thereon as described above. The fishing chair by nature is used generally at places which are slippery and unsteady. When it is fabricated in a collapsible construction, desirable stability thereof relative to the boat deck, for example, can be attained by disposing several reinforcing members 30 and 31 which are across the front legs and the hind legs end reinforcing members 30 and 31 capable of preventing the leg ends from slippage as indicated in the working example described below.

Figure 8:
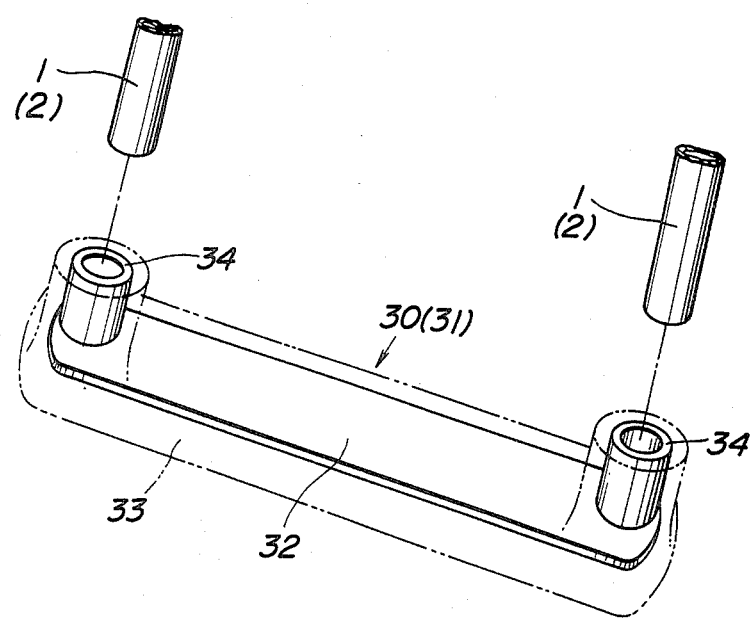
FIG. 8 is a magnified perspective view of a connecting board for a leg end reinforcing member.
Figure 9:
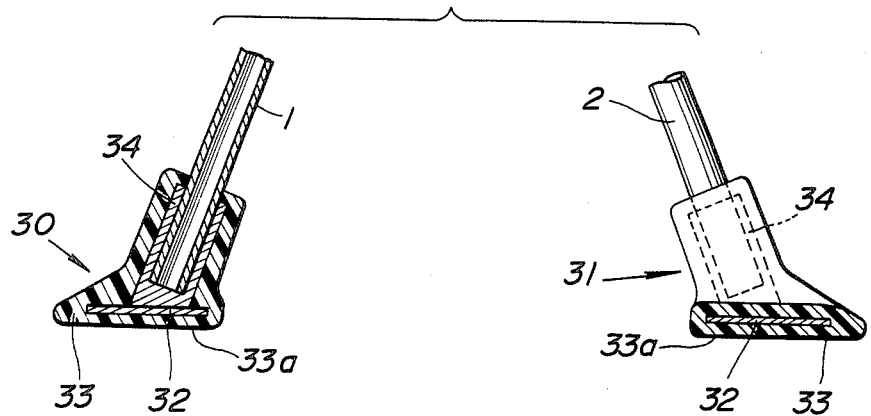
FIG. 9 is a magnified cross-sectional view of the leg end reinforcing member, the righthand section along the central part of a leg and the lefthand section along the central part of the length of a connecting member.

As illustrated in FIGS. 8 and 9, the leg end reinforcing members 30 and 31 each comprise a resilient connecting board 32 intended as a core and a wrapping member 33 serving to enclose the connecting board. The connecting board 32 is a thin belt-like metallic plate possessing resiliency and provided at each of the opposite ends thereof with a tubular fitting member 34. By fitting these tubular fitting members 34 on the ends of the front legs and those of the hind legs, the leg end reinforcing members 32 are allowed to interconnect the front legs and the hind legs.

After the legs have been interconnected as described above, these connecting boards in conjunction with the leg ends are wrapped entirely with an elastic material such as rubber or flexible synthetic resin to form the wrapping members 33 on the connecting boards.

The leg end reinforcing member 30 and 31 come in direct contact with the floor surface and support the fishing chair proper. For this purpose, the belt-like connecting boards 32 are attached to the legs at an angle such that when the front and hind legs 1 and 2 are opened, the lower sides thereof will fall in a horizontal plane as illustrated in FIG. 9. By the sake token, the wrapping members 33 enclosing the connecting boards 32 are diverged downwardly so that the lower sides 33a thereof will have a flat surface.

Figure 10:
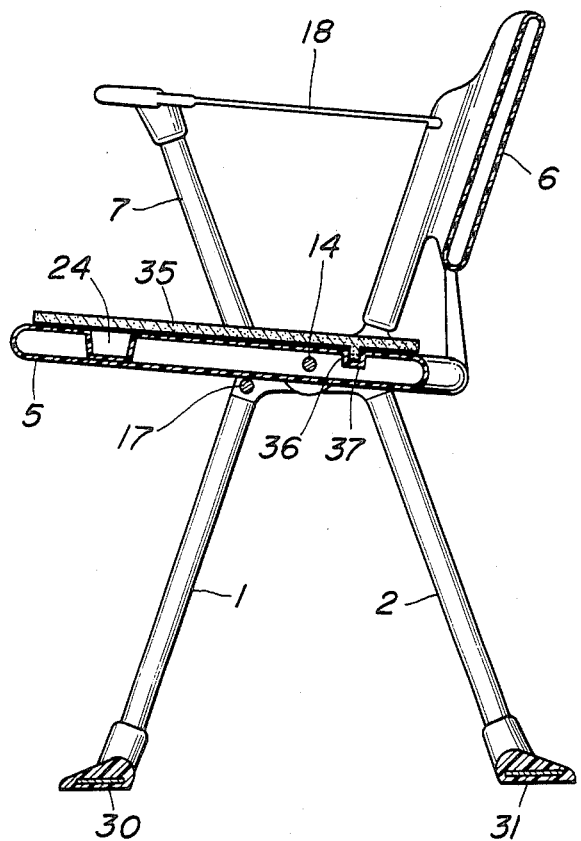
FIG. 10 is a longitudinally sectioned side view of another embodiment of the fishing chair of this invention with the legs opened and readied for use.

The folding chair of this invention is constructed as described above. It is readied for use by rotating the pivotal parts 10 and 11 about the pivotal shaft 14 as the fulcrum thereby opening the front and hind legs 1 and 2 and turning the raised seat member 5 to a horizontal position and bringing the lower side of the seat member 5 into contact with the stoppers 17 as illustrated in FIG. 10, with the result that the folding chair will be spread into a state fit for sitting. At the same time, this leg opening operation causes the armrest supports 7 to be opened toward the front side and the armrest belts 18 to be drawn forward and stretched taut between the supports 7 and the through holes 20 in the backrest 6, with the result that the armrest parts will be formed on the opposite sides of the seat member.

In this case, as a result of the tension of the armrest belts 18, the ends of the belts fixed at one end to the fixing parts 21 of the seat member are simultaneously stretched. As a result, the drawn ends of the belts keep the rear part of the seat member upwardly disposed and prevent the seat member from being rotated downwardly in the folding direction. While the legs are in the process of being opened, the upper and lower surface of the connecting members 3 and 4 are brought into mutual planar contact and, because of this contact, the legs are restricted from rotating beyond a fixed angle. Thus, the folding chair retains a fixed posture and bears the body weight of the angler.

When the front and hind legs 1 and 2 are opened, the leg end reinforcing members 30 and 31 at the leading ends of the legs are simultaneously opened so that the lower sides 33a of the reinforcing member 30 and 31 will be brought to a level position parallel with the floor surface.

The folding chair of this invention which is readied for use by having the legs opened as described above can be folded into a flat state illustrated in FIG. 7 by closing the front and hind legs 1 and 2 with the pivotal shaft 14 as the fulcrum and by raising the seat plate.

In accordance with the embodiment described above, since alternately opposed front legs and similarly opposed hind legs are collectively integrally connected with the leg end reinforcing members 30 and 31 the individual legs are held in a mutually reinforcing state and exhibit an increased strength. Furthermore, since the aforementioned leg end reinforcing members of the present invention use as cores thereof the connecting boards 32 having resilience, even when the floor surface on which the folding chair is to be used is so rugged that the positions of the leg ends are vertically deviated from one another, the body weight of the angler exerted on the chair coupled with the flexibility of the legs themselves and the rotation of the pivotal parts of the front and hind legs causes the laterally opposed leg ends to bend the connecting boards and consequently allows the leg ends to contact with floor surface. Unlike the conventional chair, therefore, the folding chair of this invention never experiences the inconvenience that one of the four leg ends floats up from a floor having a rugged or curved surface.

Since the wrapping members which enclose the connecting boards of the leg end reinforcing members are formed of an elastic material such as rubber or flexible synthetic resin, the leg end reinforcing members readily conform to the rugged surface of the floor adhere to the floor surface in a highly satisfactory manner and further function to suppress slipperiness on the floor surface. Thus, the folding chair of this invention adapts itself perfectly to a floor having a more or less inclined surface and keeps the angler in a stably seated condition.

In the embodiment of FIG. 10, a cushion 35 made of foam rubber or foam resin is mounted on the upper side of the seat member 5 instead of the aforementioned rotary seat plate 22 in order for the angler to be seated comfortably. In this case, the cushion 35 is prevented from accidentally separating from the seat member by, for example, forming an engaging projection 36 on the under side of the cushion 35 and an engaging depression 37 on the upper side of the seat plate 22 and bringing the projection 36 and the depression 37 into a tight detachable engagement. Of course, the fishing chair can be effectively used in without the cushion 35.

The front legs 1, the hind legs 2, the seat member 5 and so on which are component parts of the folding chair of the present invention are hollow airtight pieces. This construction is aimed at decreasing the overall weight of the chair and, at the same time, allowing the chair to float on the water when it accidentally falls off of the boat and into the water.

The rotary seat plate provided with the grip holder is readily mounted rotatably on the seat member in a state fit for sitting as described above. The angler seated on this fishing chair, therefore, is able to change the direction of his body suitably in conjunction with the grip end of the fishing rod firmly held in the grip holder. Furthermore, since the bases of the front and hind legs, which are intended to contact the floor surface, are provided with the leg end reinforcing members having an antislip construction, the folding chair of this invention can be used of course in applications generally found for ordinary chairs and can also be used optimally on floors having wet and slippery surfaces or more or less rugged and inclined surfaces as found on boat decks, for example. It always enables the angler to be seated stably. Thus, the present invention is expected to find extensive utility in applications pertaining to chairs used by persons enjoying fishing and other leisure activities.

Although the invention has been described in its preferred form with a certain degree of particularity, it is understood that the present disclosure of the preferred form is not limited to the details of construction described herein, and the combination and arrangement of parts may be varied without departing from the spirit and the scope of the invention as hereinafter claimed.

What is claimed is:

1. A fishing chair comprising:
   a seat member;
   a rotary seat plate detachably mounted to an upper surface of said seat member for rotating relative to the surface of said seat member, and fulcrum means for defining a center of rotation about which said rotary seat plate is rotatable relative to said seat member, the center of rotation defined by said fulcrum means at a location substantially halfway between a central part of the seat plate and a front edge of the seat plate; and a grip holder disposed on the rotary seat plate adjacent the front edge thereof for supporting a grip end of a fishing rod.

2. A fishing chair as claimed in claim 1,
wherein said fulcrum means comprises a protuberance extending from a lower surface of the rotary seat plate into a recess extending in said upper surface of the seat member, said protuberance being insertable in and removable from the recess.

3. A fishing chair as claimed in claim 2,
wherein said protuberance has a hemispherical leading end engaged in point contact with said seat member at a surface thereof defining the bottom of said recess.

4. A fishing chair as claimed in claim 1,
and further comprising a sliding projection extending from a lower surface of the rotary seat plate, said fulcrum means disposed between said front edge of the rotary seat plate and said sliding projection, the sliding projection in sliding engagement with said upper surface of the seat plate.

5. A fishing chair as claimed in claim 1,
and further comprising front legs and hind legs for supporting said seat plate, the seat plate being pivotally mounted to said legs, and a connecting member for pivotally interconnecting the front and the hind legs.

6. A fishing chair as claimed in claim 5,
wherein said seat member, said front legs and said hind legs are hollow airtight pieces.

7. A fishing chair as claimed in claim 5,
and further comprising a backrest extending upwardly from said front legs and fixed thereto via said connecting members, armrest supports extending upwardly from said hind legs and fixed thereto via said connecting members, and respective armrest belts extending between the backrest and upper ends of said armrest supports.

8. A fishing chair as claimed in claim 1,
and further comprising laterally opposed front legs to which a backrest is supported at upper portions of the front legs, laterally opposed hind legs pivotally attached to said front legs via a pivotal shaft extending therebetween, said front legs and said hind legs being pivotable about said pivotal shaft from a first position at which the chair is open and is capable of being sat in to a second position at which the chair assumes a generally flat configuration, and respective resilient connecting boards each of which extends between said laterally opposed front legs collectively and said laterally opposed hind legs collectively for reinforcing said legs.

9. A fishing chair as claimed in claim 1,
wherein said upper surface is a generally flat support surface on which a person can sit when said rotary seat plate is detached from the seat member.

* * * * *